March 19, 1963  R. E. KNOEDLER  3,081,862
TAILGATE AUGER
Filed July 6, 1961  2 Sheets-Sheet 1
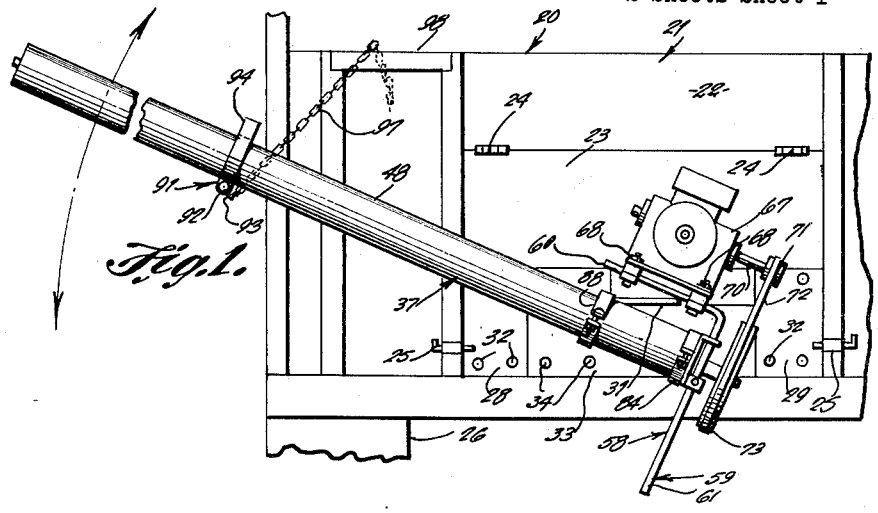
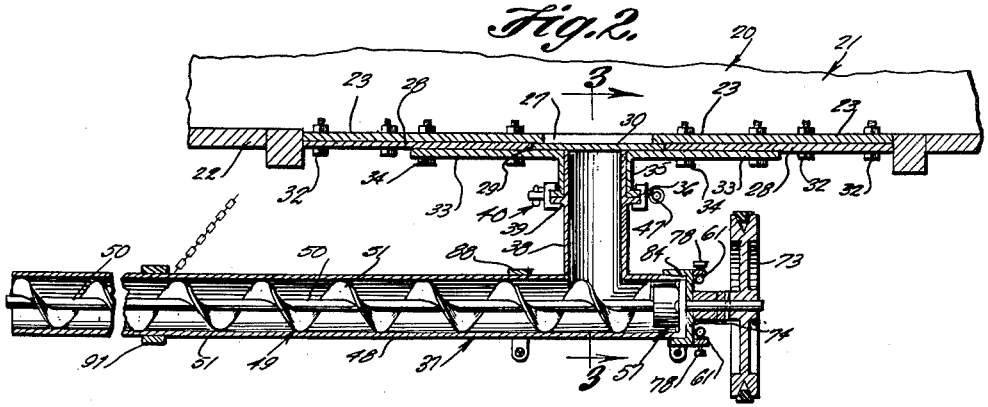
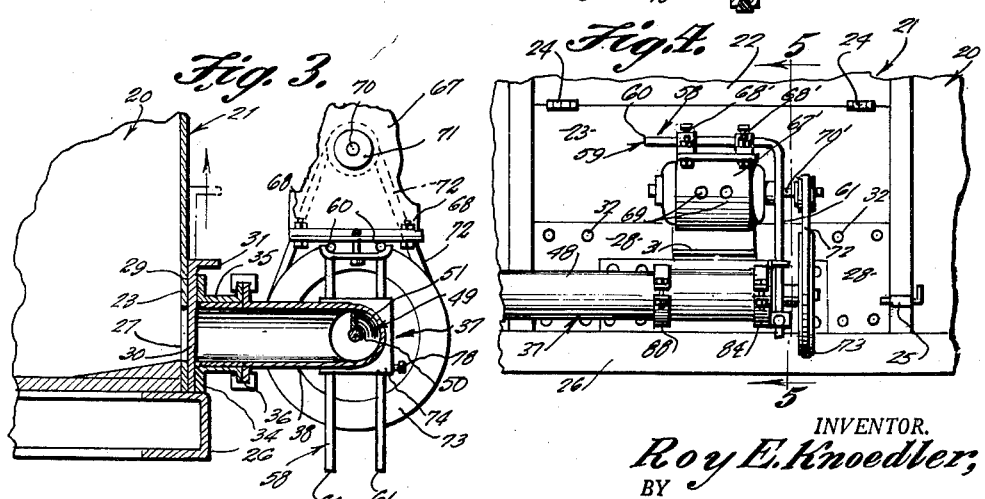
INVENTOR.
Roy E. Knoedler,
BY
Victor J. Evans & Co.
Attorneys

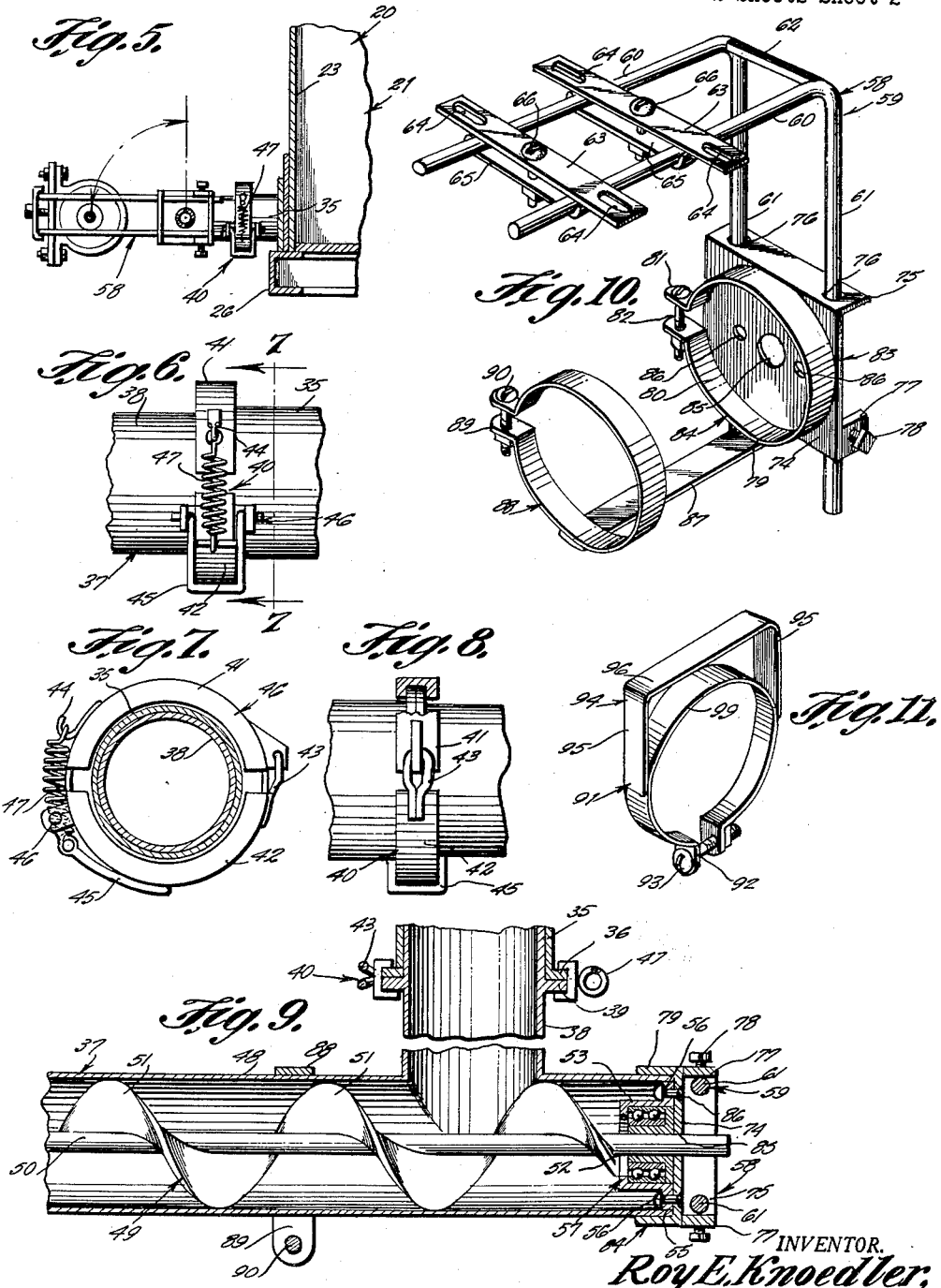

United States Patent Office 3,081,862
Patented Mar. 19, 1963

3,081,862
TAILGATE AUGER
Roy E. Knoedler, Streator, Ill.
(Box 91, Grand Ridge, Ill.)
Filed July 6, 1961, Ser. No. 122,304
1 Claim. (Cl. 198—122)

The present invention relates to an auger, and more particularly to an auger or tailgate of a wagon or truck box, body or the like.

The primary object of the present invention is to provide a tailgate auger which is especially suitable for use in unloading a dump box on a wagon or truck, so that for example various types of materials such as grain can be readily elevated or unloaded, and wherein the tailgate auger of the present invention can be used for various purposes and for example it can be used in connection with farm work to fill fertilizer and grain boxes at feeding time, and wherein the tailgate auger can be used for other purposes such as in conjunction with feed bunks and self-feeders for poultry and livestock.

A further object is to provide a tailgate auger of the type stated that can be readily attached and detached as required or desired, and wherein the tailgate auger will provide a self-unloading and elevating mechanism for various conventional dump boxes on wagons or trucks, the tailgate auger being constructed so that it can use different power sources such as an electric motor, hydraulic motor, gasoline engine, battery powered starter motor or the like, and wherein a plurality of different boxes can be equipped with tailgate opening boards and wherein this plurality of boxes can all be serviced with one auger unit, and wherein the present invention also includes a slide gate shut-off which provides a means of regulating the inlet flow into the auger.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a fragmentary rear end elevational view showing the tailgate auger of the present invention mounted on a dump truck or wagon body, and wherein the auger is in a raised position and the motor bracket has a gasoline motor mounted thereon.

FIGURE 2 is a sectional view taken through the tailgate of the vehicle such as the truck, and showing the tailgate auger mounted thereon, and in section.

FIGURE 3 is a sectional view taken on the line 3—3 of FIGURE 2.

FIGURE 4 is a view generally similar to FIGURE 1 but showing an electric motor being used instead of the gasoline engine.

FIGURE 5 is a sectional view taken on the line 5—5 of FIGURE 4 and showing the motor and bracket turned to a different position.

FIGURE 6 is an elevational view showing the coupling or connector for the stationary tailgate pipe or collar and the rotating pipe of the auger.

FIGURE 7 is a sectional view taken on the line 7—7 of FIGURE 6.

FIGURE 8 is a view looking at the opposite side from that shown in FIGURE 6, and with parts broken away and in section.

FIGURE 9 is an enlarged sectional view similar to FIGURE 2 but with parts broken away and omitted.

FIGURE 10 is a fragmentary perspective view showing the motor carrying bracket.

FIGURE 11 is a perspective view of a clamp that is connected to the auger so as to permit the auger to be raised and adjusted and held in different adjusted positions.

Referring in detail to the drawings, the numeral 20 indicates a portion of a vehicle, wagon or the like which is provided with a box or body 21 that has a rearwardly arranged tailgate 22, and the tailgate 22 is adapted to be embodied with a closure or door 23 which is hingedly supported as at 24, and latch mechanisms 25 may be provided for retaining the closure 23 in a vertical closed position relative to the tailgate 22. The numeral 26 indicates the chassis or framework which is arranged below the body 21, and the body 21 may be mounted on the chassis of a truck, trailer or the like.

As shown in FIGURE 2, the closure 23 is provided with an opening 27, and spaced apart flat base pieces 28 are arranged on opposite sides of the opening 27, and the numeral 29 indicates a space which is provided between the base pieces 28, there being a slidable control member 30 which is arranged to selectively control the flow of grain, fertilizer or the like outwardly from the body 21 through the opening 27, and the control member 30 is provided with a flange 31 on its upper end. The flange 31 is adapted to be manually gripped so that the control member 30 can be raised or lowered as desired in order to control the flow of material outwardly from the truck body 21. The base pieces 28 are adapted to be secured in place to the closure 23 in any suitable manner, as for example by means of securing elements 32. The numeral 33 indicates a plate which is secured in place as for example by means of securing elements 34, and extending outwardly from the plate 33 and secured thereto or formed integral therewith is a cylindrical collar 35 which has a circular flange 36 thereon.

The numeral 37 indicates the auger which is shown to comprise a cylindrical pipe section 38 that is adapted to have an end portion thereof snugly project into the collar 35, and affixed to the outer portion of the pipe section 38 is a circular flange or shoulder 39 which is adapted to abut the flange 36 when the parts are assembled as shown in FIGURE 2, and the numeral 40 indicates a coupling or clamp which is arranged in engagement with the flange 36 and shoulder 39. As shown in FIGURES 6, 7 and 8, the coupling 40 includes first and second channel pieces 41 and 42 which have an adjacent end hingedly connected together as at 43. A hook member 44 on the channel piece 41 has a spring member 47 connected thereto, and the numeral 45 indicates a lever which has the spring member 47 operatively connected thereto, and the lever 45 is pivotally or hingedly connected to the channel piece 42 as at 46.

The auger 37 further includes an elongated conduit 48 which is arranged at right angles with respect to the pipe section 38 and which is secured thereto or formed integral therewith, and arranged within the conduit 48 is a screw conveyor 49 which includes a shaft 50 which extends longitudinally through the conduit 48, and a spiral blade or vane 51 is suitably affixed to the shaft 50 for rotation within the conduit 48. The numeral 57 indicates a bearing unit that is arranged within an end portion of the conduit 48, and the bearing unit 57 includes inner and outer elements 52 and 53 which have a bearing race 54 interposed therebetween so as to help insure that the screw conveyor 49 can rotate with a minimum amount of friction. The outer element 53 is provided with a flange 55 which is adapted to be secured in place as for example by means of securing elements 56.

As shown in the drawings there is provided a bracket assembly which is indicated generally by the numeral 58, and the bracket assembly 58 includes a pair of spaced parallel L-shaped rods 59 which each includes first and second portions 60 and 61, and the rods 59 are joined together by a brace 62. The numeral 63 indicates arms which are adjustably connected to the portions such as the portions 60 of the rods 59, and there is provided base elements or bars 65 for coaction with the arms 63, the arms 63 having slots 64 in the end portions thereof. The bars 65 and arms 63 are adapted to be adjustably connected together by means of securing elements or bolt and nut units 66. As shown in FIGURE 1 a gasoline engine 67 is adapted to be connected to the arms 63, as for example by means of bolts 68 which can be extended through the slots 64. Or, as shown in FIGURE 4 an electric motor 67' can be connected to the arms 63, and such an electric motor 67' may be connected to a suitable source of electrical energy as for example by means of conductors or wires 69. The numeral 70 indicates a shaft which is adapted to be driven by the motor 67 or 67', and a pulley 71 is suitably affixed to the shaft 70, there being an endless belt 72 trained over the pulley 71, and the belt 72 is also trained around a pulley 73 which is suitably connected to the projecting end portion of the shaft 50.

As shown in FIGURE 10 for example a support member 83 is adjustably connected to the portion 61 of the rods 59, and the support member 83 includes a wall portion 74 which has spaced parallel lips 75 secured thereto or formed integral therewith, and the lips 75 have apertures or openings 76 for the projection therethrough of the portion 61 of the rods 59. Apertured ears 77 are affixed to the wall portion 74, and set screws 78 are adjustably connected to the ears 77 for engaging the portion 61 of the rods 59 in order to maintain the support member 83 immobile in its various adjusted positions.

The numeral 84 indicates a first ring member which has a portion 79 secured as by welding to the wall 74 of the support member 83, and the ring member 84 also includes a portion 80 which can flex slightly so that a clamping action can be exerted on an end portion of the conduit 48, and the ring member 84 is provided with flat end portions 81 which are interconnected by a bolt or screw 82. The numeral 85 indicates an aperture or opening in the wall portion 74 for the projection therethrough of the shaft 50, and as shown in FIGURE 10 there is provided small openings or apertures 86 in the wall 74 whereby securing elements 56 can be arranged in threaded engagement with such apertures 86 in order to maintain the bearing unit 57 in its proper location.

The numeral 87 indicates a strap or bar which is secured as by welding to the first ring member 84, and a second ring member 88 is arranged in spaced parallel relation with respect to the first ring member 84, and the ring member 88 is provided with flat end portions 89 which are interconnected by means of a screw or bolt 90.

As shown in FIGURE 11, there is provided a clamp which is indicated generally by the numeral 91, and the clamp 91 includes a generally circular ring piece 99 which has its ends shaped to include flat end portions 92 that are connected together by means of a screw or bolt 93. The numeral 94 indicates a generally U-shaped handle member or element which includes spaced parallel portions 95 that are secured as by welding to the ring 99, and the member 94 further includes a connecting portion 96. As shown in FIGURE 1 a line or chain 97 is adapted to be connected to the clamp 91, and the chain 97 is adapted to have a portion thereof wrapped around or connected to a suitable bar or other element 98 on the tailgate 22.

From the foregoing, it is apparent that there has been provided an auger which is especially suitable for use on the tailgate of a truck, wagon or the like, and in use with the parts arranged as shown in the drawings, it will be seen that a suitable opening such as the opening 27 is adapted to be arranged in the tailgate or in a member such as the closure 23 which is associated with the tailgate, and the control member 30 can be raised or lowered by manually engaging the lip or lug 31 so that the control member 30 can be used to control the grain, fertilizer or the like which discharges outwardly through the opening 27 from the wagon or vehicle body 20. With a motor such as a gasoline engine 67 connected to the arm 63 by means of the bolts 68 which extend through the slots 64, and with the parts arranged as shown in FIGURE 1 for example, it will be seen that as the engine 67 is actuated, the shaft 70 will be rotated so as to drive the pulley 71 which in turn will cause movement of the belt 72, and since the belt 72 is trained around the pulley 73, it will be seen that this will cause rotation of the shaft 50 in view of the fact that the pulley 73 is connected to the outer projecting end of the shaft 50. As the shaft 50 rotates, the spiral blade 51 will turn so that the grain, fertilizer or the like which discharges out through the opening 27 will flow outwardly through the pipe section 38 and then be conveyed through the conduit 48 by means of the screw conveyor 49. The grain, fertilizer or the like can be discharged through the open end of the conduit 48 into any suitable locality, receptacle or the like, and as shown in FIGURE 1 the conduit 48 is arranged so that its open end is in an elevated position whereby this grain or fertilizer or other material can be conveniently elevated and discharged into a truck, bin, wagon or the like. The conduit 48 is maintained in an upwardly inclined or elevated position by means of the chain 97 which has one end connected to the screw member 92 of the coupling 91, and the chain 97 is adapted to be wrapped around an element such as a bar 98 which is suitably secured to the tailgate 22 and this construction serves to insure that the conduit 48 will be maintained properly elevated or inclined. When the inclination or position of the conduit 48 is to be shifted or adjusted, it is only necessary to disengage or disconnect the chain 97 from an element such as the element 98 whereby the conduit 48 can be moved to a different position and then the chain 97 can again be anchored in place to an element such as the element 98 in order to maintain the conduit 48 and its associated parts immobile in their adjusted positions.

When the auger is not being used or when it is not needed, the coupling 40 can be disconnected, and when the parts are in the position of FIGURE 2 for example, the coupling 40 serves to maintain the auger properly connected to the collar 35 so that the grain or fertilizer can be properly discharged or handled. With the parts arranged as shown in FIGURES 2, 6, 7 and 8, it will be seen that the pair of channel pieces 41 and 42 straddle the shoulder 39 and flange 36, and due to the provision of the hinge 43 and spring 47 as well as the lever 45, it will be seen that the spring 47 will have a tendency to maintain the pair of channel pieces 41 and 42 in clamping engagement with the flange 36 and shoulder 39, so that accidental separation or disengagement of the pipe section 38 and collar 35 will be prevented. However, when the auger is not being used, or when it is not needed, the coupling 40 can be released so as to permit the pipe section 38 to be separated or disconnected from the collar 35, and to release the coupling 40 it is only necessary to manually swing or pivot the lever 45 in a counterclockwise direction, FIGURE 7, so that the tension exerted by the spring 47 will be released whereby the channel pieces 41 and 42 can be disconnected or removed from the abutting shoulder 39 and flange 36, and with the coupling 40 released, the pipe section 38 can be disconnected or removed from the collar 35.

The bearing unit 57 serves to insure that the shaft 50 will rotate with a minimum amount of friction, and also serves to insure that the shaft 50 and blade 51 will be maintained in their proper aligned positions during actuation or rotation thereof. The outer element 53 of the bearing unit 57 is adapted to be connected in place by means of the screws or bolts 56 which extend through the flange 55 of the outer element 53 and into engagement with threaded openings such as the openings 86 in the wall portion 74 of the support member 83 and this arrangement provides a means of affixing or securing the bearing unit 57 in place.

The position of the clamp 91 on the conduit 48 can be varied or changed as desired, and for example when the clamp 91 is to be moved on the conduit 48, the screw 93 is adapted to be loosened so that the handle portion 94 can be manually gripped in order to move the clamp 91 to the desired location on the conduit 48, and then the screw 93 can be tightened in order to maintain the clamp 91 stationary in its desired position.

As shown in FIGURE 1 a gasoline engine 67 may be connected to the arms 63 as for example by means of the bolts 68. In FIGURE 4 there is illustrated a modification or alternative arrangement wherein an electric motor 67' is shown suspended below the arms 63 by means of bolts 68', and such an electric motor 67' may be connected to a suitable source of electric current as for example by means of wires 69.

The bracket 58 is arranged and constructed as shown in FIGURE 10, and it will be seen that the bracket 58 includes a pair of L-shaped rods 59 which each includes the portions 60, and the arms 63 are clamped to the portions 60 as for example by means of the elements 65 which are engaged by the screws or bolts 66. By loosening the screws 66, the arms 63 and elements 65 can be shifted to the desired location on the rod portions 60, and then the screws 66 can be tightened in order to maintain these parts in a stationary position in their desired location.

Similarly the position of the support member 83 on the rod portions 61 can be adjusted by loosening the bolts or set screws 78 whereby the support member 83 can be adjusted on the rod portions 61 to the desired location, and then the set screws 78 can be tightened until the set screws 78 engage the rod portions 61 whereby accidental shifting or movement of the support member 83 and its associated parts will be prevented. The rod portions 61 extend through apertures or openings 66 in the flanges 75, and the support member 83 includes the wall portion 74 which has the central opening 85 therein in order to provide clearance for the projecting end portion of the shaft 50. The ring member 84 has a portion 79 thereof secured as by welding to the wall portion 74, and the ring member 79 is adapted to surround an end portion of the conduit 48 so that by tightening the screw 82, the flexible portion 80 of the ring member 84 can be tightened or clamped onto the conduit 48 in order to provide a means for fastening the bracket to the conduit. Similarly, by loosening the screw 82, the ring member 84 will be released from clamping engagement with the end of the conduit 48 so that relative adjustment or movement between the conduit and ring member 84 can take place. The strap or bar 87 is secured as by welding to the ring member 84, and the ring member 88 is suitably secured to the strap 87, and the ring member 88 is adapted to be clamped around the conduit 48 as for example by means of the screw 90 which engages the portions 89 so as to provide a further means of mounting the bracket assembly on the conduit of the auger 37.

When using an electric motor such as the motor 67' of FIGURE 4, the shaft 70' is adapted to furnish power to rotate the pulley 71 in order to drive the screw conveyor 49 through the belt such as the belt drive 72 in the same manner as described in connection with the gasoline engine 67.

The parts can be made of any suitable material and in different shapes or sizes.

Some of the advantages of the tailgate auger of the present invention are as follows. A quick attaching and detaching tailgate auger construction at a minimum cost is provided, and wherein the present invention can be used to provide self-unloading and elevating arrangement for any conventional dump box on a wagon or truck. In addition the present invention can use a variety of power sources such as an electric motor, hydraulic motor, gasoline engine, battery powered starter motor or the like. Also, if desired several boxes can be equipped with tailgate opening boards and all can be serviced with one auger unit. In addition, the tailgate auger can be used for various purposes, as for example it can be used in farm fields to fill fertilizer and grain boxes at feeding time, and it can also be used to feed bunks and self-feeders for poultry and livestock. The slide gate or control member 30 provides a means of regulating the inlet flow into the auger, and for heavier materials, where minimum power might be available, the slide gate 30 can be partially open so as to insure that the motor will not stall.

While certain embodiments of the invention have been illustrated and described in detail, it will be obvious that the invention may be otherwise embodied and the dimensions and interrelation of parts changed so long as the objects of the invention are attained.

What is claimed is:

A tailgate auger comprising a plate having a cylindrical collar extending outwardly therefrom, a circular flange on the outer end of said collar, a pipe section adapted to have an end portion positioned within said collar and said pipe section having a circular shoulder thereon which abuts said flange, a coupling arranged in engagement with said shoulder and flange and said coupling including first and second arcuate channel pieces hingedly connected together, a lever and coil spring operatively connected to said channel pieces, said auger further including an elongated conduit having its longitudinal axis arranged at right angles with respect to said pipe section, a screw conveyor including a shaft extending longitudinally through said conduit and said shaft having a spiral blade thereon, a bearing unit in an end of said conduit and said bearing unit having said shaft extending therethrough, a bracket including a pair of L-shaped rods, a brace connecting said rods together, slotted arms adjustably connected to said rods, bars and securing elements for coaction with said arms, an engine supported by said arms, drive means operatively connecting said engine to said shaft, a support member including a wall portion connected to said rods, set screws for maintaining said support member immobile in its adjusted positions on said rods, first and second ring members connected together by means of a strap, and said ring members clampingly surrounding a portion of said conduit, and one of said ring members having a portion thereof secured to the wall portion of said support member, a clamp adjustably connected to said conduit, and a supporting line connected to said clamp.

References Cited in the file of this patent

UNITED STATES PATENTS

| | | |
|---|---|---|
| 1,831,561 | Harris | Nov. 10, 1931 |
| 2,276,903 | Welty | Mar. 17, 1942 |
| 2,332,729 | Klosterman | Oct. 26, 1943 |
| 2,751,097 | Miller | June 19, 1956 |
| 2,934,224 | Puckett | Apr. 26, 1960 |